United States Patent [19]

Sullivan et al.

[11] Patent Number: 5,287,200
[45] Date of Patent: Feb. 15, 1994

[54] BLOCK ADAPTIVE LINEAR PREDICTIVE CODING WITH MULTI-DIMENSIONAL ADAPTIVE GAIN AND BIAS

[75] Inventors: James R. Sullivan, Spencerport; Craig M. Smith, Rochester, both of N.Y.

[73] Assignee: Eastman Kodak Company, Rochester, N.Y.

[21] Appl. No.: 66,645

[22] Filed: May 24, 1993

Related U.S. Application Data

[63] Continuation of Ser. No. 522,763, May 14, 1990, abandoned.

[51] Int. Cl.$^5$ .............................................. H04N 1/415
[52] U.S. Cl. .................................... 358/433; 358/427; 358/428; 358/430; 358/432
[58] Field of Search ............... 358/427, 428, 430, 432, 358/433

[56] References Cited

U.S. PATENT DOCUMENTS

| 4,386,366 | 5/1983 | Mari | 358/430 |
|---|---|---|---|
| 4,656,523 | 4/1987 | Mizutani | 358/430 |
| 4,885,636 | 12/1989 | Sullivan | 358/133 |
| 4,992,889 | 2/1991 | Yamagami et al. | 358/430 |
| 5,051,840 | 9/1991 | Watanabe et al. | 358/433 |

OTHER PUBLICATIONS

"DPCM Picture Coding with Adaptive Prediction" by Zachumke, IEEE Transactions on Communications, vol. Com-25, Nov. 1977, pp. 1295-1302.
The article "Adaptive Predictive Coding with Applications to Radiographs" cited by M. Rabbani et al.
The article "On the Design of Quantizers for DPCM Coders: A Functional Relationship Between Visibility, Probability, and Masking" cited by J. O. Limb et al.
The article "A New ADPCM Image Compression Algorithm and the Effect of Fixed Pattern Sensor Noise": by J. Sullivan, SPIE vol. 1075, 1989, pp. 129-138, and related patent U.S. 4,385,636 entitled Block Adaptive Linear Predictive Coding with Adaptive Gain and Bias.
Digital Image Processing by W. K. Pratt, John Wiley & Sons, 1978, p. 653, chapter 22.3, p. 144.
Digital Signal Processing by R. C. Gonzalez and P. Wintz Addison-Wesley Co., pp. 239-241.

*Primary Examiner*—John K. Peng
*Assistant Examiner*—Edward Lefkowitz
*Attorney, Agent, or Firm*—Thomas H. Close

[57] ABSTRACT

A block adaptive linear predictive coding method for encoding a signal having multi-dimensional correlation, such as an image signal as improved by employing multi-dimensional blocks of error signals for making the prediction. As a preferred mode, two statistical quantities are employed to select a quantizer from a set of minimum square error two-variable quantizers based on probability models of statistical quantities.

11 Claims, 11 Drawing Sheets

$\tilde{x}_{p-1,s-1}$ $\tilde{x}_{p,s-1}$ $\tilde{x}_{p+1,s-1}$

| $x_{p,s}$ | $x_{p+1,s}$ |
|---|---|
| $x_{p,s+1}$ | $x_{p+1,s+1}$ |

$\tilde{x}_{p-1,s}$ $\tilde{x}_{p-1,s+1}$ $\hat{x}_{p,s} = A_0 \tilde{x}_{p-1,s} + A_1 \tilde{x}_{p-1,s-1} + A_2 \tilde{x}_{p,s-1}$ $\tilde{x}_{p,s} = x_{p,s} + E_{p,s}$ $\hat{x}_{p+1,s} = A_0 \tilde{x}_{p,s} + A_1 \tilde{x}_{p-1,s} + A_2 \tilde{x}_{p+1,s-1}$ $\tilde{x}_{p+1,s} = x_{p+1,s} + E_{p+1,s}$ $\hat{x}_{p,s+1} = A_0 \tilde{x}_{p-1,s+1} + A_1 \tilde{x}_{p-1,s} + A_2 \tilde{x}_{p,s}$ $\tilde{x}_{p,s+1} = x_{p,s+1} + E_{p,s+1}$ $\hat{x}_{p+1,s+1} = A_0 \tilde{x}_{p,s+1} + A_1 \tilde{x}_{p,s} + A_2 \tilde{x}_{p+1,s}$ $\tilde{x}_{p+1,s+1} = x_{p+1,s+1} + E_{p+1,s+1}$ ; WHERE $E_{ij}$ IS THE COMPRESSION ERROR, NAMELY $E_{ij} = \Delta_{ij} - \hat{\Delta}_{ij}$.

BLOCK ADAPTIVE LINEAR PREDICTIVE CODING WITH MULTI-DIMENSIONAL ADAPTIVE GAIN AND BIAS

This is a continuation of application Ser. No. 522,763, filed May 14, 1990, now abandoned.

TECHNICAL FIELD

The present invention relates to the field of digital image processing and more particularly to a method for compressing a digital image signal by block adaptive linear predictive coding.

BACKGROUND ART

Image compression is an essential element of many digital imaging systems due to the vast amount of information contained in a digitized image. Because of its simplicity, compression efficiency and ease of implementation, linear predictive coding (LPC) is often used to compress image data for storage and transmission. LPC refers to the general class of coding techniques in which the difference or error between a given signal value and a linear prediction of the signal value, based on correlated signal values, is coded. The advantage of coding the error signal is that it is less correlated, has lower variance, and is more stationary than the original signal, which make it easier to compress.

Depending on the type of image and the level of adaptability to variations in image structure, compression ratios from 2:1 to 6:1 have been achieved. Both adaptive prediction (see, for example, "DPCM Picture Coding with Adaptive Prediction" by Zschunke, IEEE Transaction on Communications, Vol. Com-25, November, 1977, pages 1295-1302), and adaptive quantization (see, for example, "Adaptive Predictive Coding with Applications to Radiographs" by M. Rabbani, L. A. Ray, and J. Sullivan, Medical Instrumentation, Vol. 20, No. 4, July-August, 1986, pages 182-191) have been examined, with most of the emphasis being placed on adaptive quantization due to its superior performance for a given hardware implementation complexity.

The predominant adaptive quantization technique is termed block-adaptive wherein a quantizer is selected from a finite set of quantizers to encode a one-dimensional block of error signals based on the statistics of independent one-dimensional blocks. A number of empirical studies have been conducted to establish the best set of single-variable quantizers (see, for example, "On the Design of Quantizers for DPCM Coders: A Functional Relationship Between Visibility, Probability, and Masking" by J. O. Limb and C. B. Rubinstein, IEEE Transactions on Communications Techniques, COM-26, 1978, pages 573-578) and multi-variable quantizers (see, for example, "A New ADPCM Image Compression Algorithm and the Effect of Fixed-Pattern Sensor Noise" by J. Sullivan, SPIE Vol 1075, 1989, pages 129-138, and U.S. Pat. No. 4,885,636 entitled "Block Adaptive Linear Productive Coding with Adaptive Gain and Bias," issued Dec. 5, 1989 to the present inventor, which is incorporated herein by reference). All of these studies have concerned variations in the quantizer based on one-dimensional block-to-block variations of the error signal statistics. It is an object of the present invention to provide a new block adaptive LPC technique that improves the compression ratio over the aforementioned techniques for a given image fidelity for all classes of images of interest to a human observer, thereby reducing storage requirements and/or transmission times.

SUMMARY OF THE INVENTION

According to one aspect of the present invention, the object is achieved by applying the block adaptive quantizer selection to multi-dimensional blocks of error signals, rather than the one-dimensional linear blocks employed in the prior art. When two-dimensional blocks of error signals are employed on still images, surprising improvements in compression ratio on the order of one to three db are achieved. In the preferred mode of practicing the invention for a k-dimensional signal, block-to-block variations of the centroid (preferably mean) of the error signal from zero as well as the block-to-block variations of the sigma value of the error signal in the k-dimensional blocks are measured. The quantizer is adapted to these variations by selecting from a set of two-variable quantizers optimally designed to minimize the square difference between the input error signal and the coded error signal.

For a two-dimensional image signal, excluding the first pixel in each image line and the first line of pixels (which are directly quantized) the error signal is formed for each pixel in an $N1 \times N2$ block by making a prediction of the pixel value from previously coded error signals that are in close proximity to the pixel value in two dimensions, and subtracting the prediction from the pixel value. The error signals in the $N1 \times N2$ block are then quantized by selecting from a set of two-variable quantizers designed for the class of images to which the current image belongs, by performing the following steps: (1) forming independent $N1 \times N2$ blocks of error signals without using a quantizer; (2) forming, maximum likelihood (ML) estimates for a function of the mean and sigma value of the error signals in a block; (3) from the minimum square error decision regions of the mean and sigma values for the class of images, determining which two-variable decision region contains the ML estimates; (4) using the minimum square error reconstruction values for sigma (gain) and mean (bias) from the selected region to construct the minimum square error quantizer for the error signal in the block; (5) quantizing the error signal in the block employing the constructed quantizer; (6) transmitting or storing the quantized (coded) error signal and a code word for the selected quantizer; and (7) proceeding to the next block and repeating the steps (1)–(6) until all the lines of image signals are processed.

According to another aspect of the present invention, the object is achieved by identifying runs of two-dimensional blocks having low contrast for which visually accurate reconstruction can be performed from previous reconstructed pixels without encoded error signals, and run encoding these blocks using a special quantizer code. According to a further aspect of the present invention, the object is achieved by providing quantizers having different numbers of quantization levels based on the value of sigma, higher values of sigma having more quantization levels.

MODES OF CARRYING OUT THE INVENTION

Before describing the method of the present invention in detail, the derivation of the mean and sigma ML estimates for a Laplacian signal and the derivation of the minimum square error set of quantizers will be described.

Figure 2:
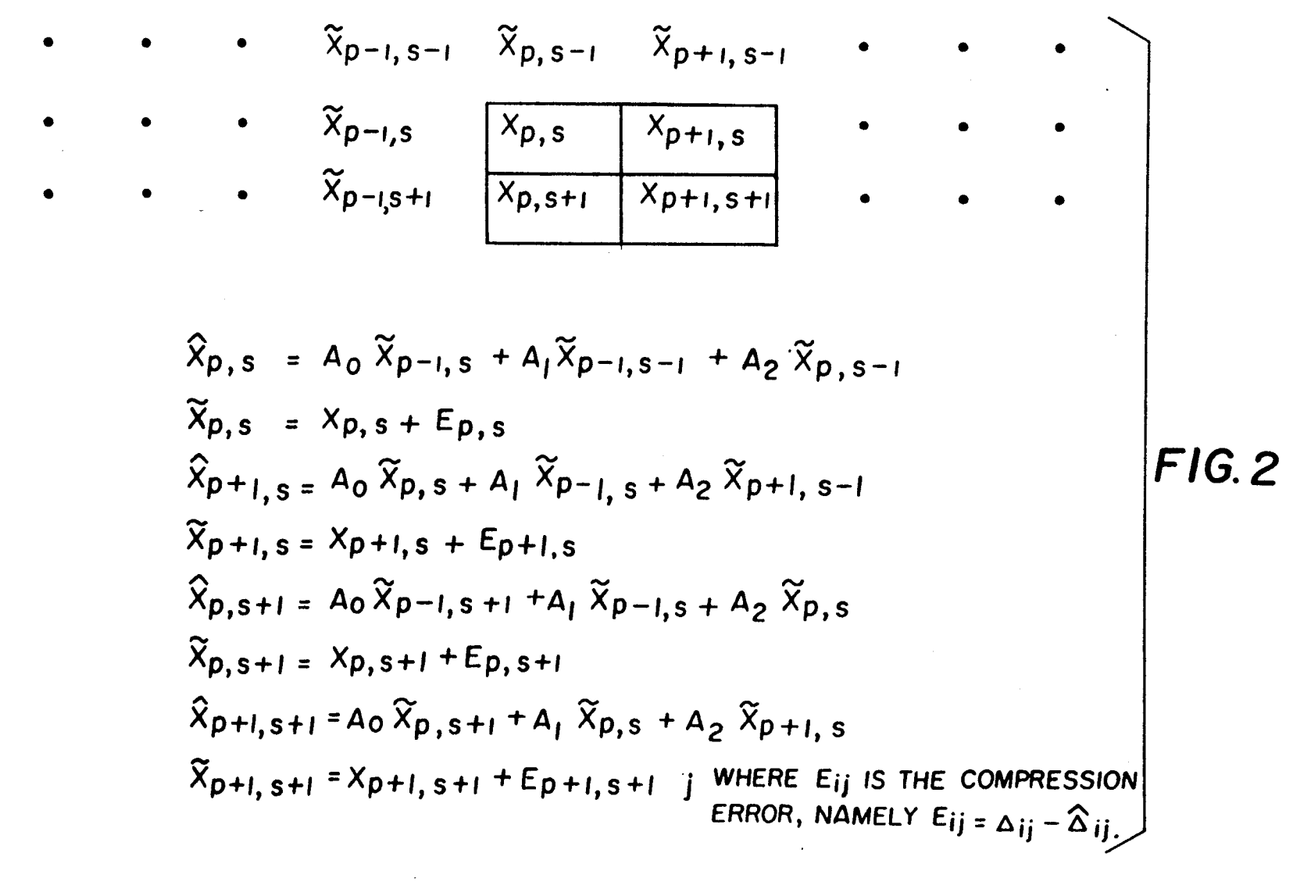
FIG. 2 is a graph showing the pixels included in a typical two-dimensional linear predictor for a 2×2 block, and the prediction equations.

The most commonly employed model for probability density function (pdf) of the error signal $\Delta_{ij} = X_{ij} - \hat{X}_{ij}$, formed by subtracting from an input pixel value the linear combination of reconstructed pixel values as illustrated in FIG. 2 is a Laplacian (see "Digital Image Processing" by W. K. Pratt, page 653, John Wiley & Sons, 1978) which for a non-zero mean signal is given by $$p(\Delta) = \frac{1}{\sqrt{2} \cdot \sigma} \exp^{-\sqrt{2}\left|\frac{\Delta - \mu}{\sigma}\right|}. \quad (1)$$

Figure 3:
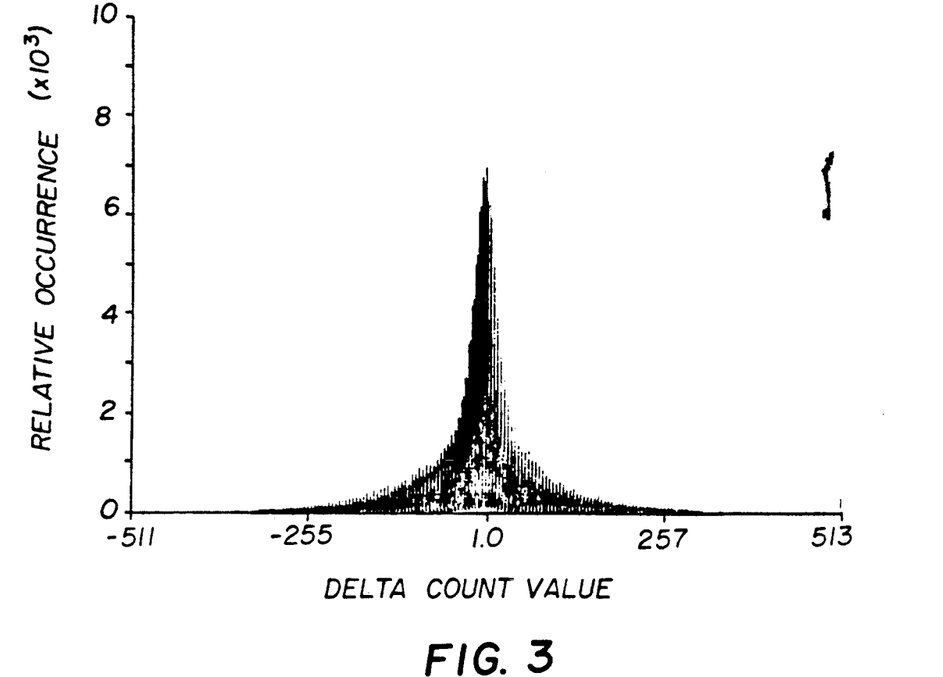
FIG. 3 is a graph showing a typical error signal histogram illustrating the peaked, Laplacian-like nature of the error signal.
Figure 4:
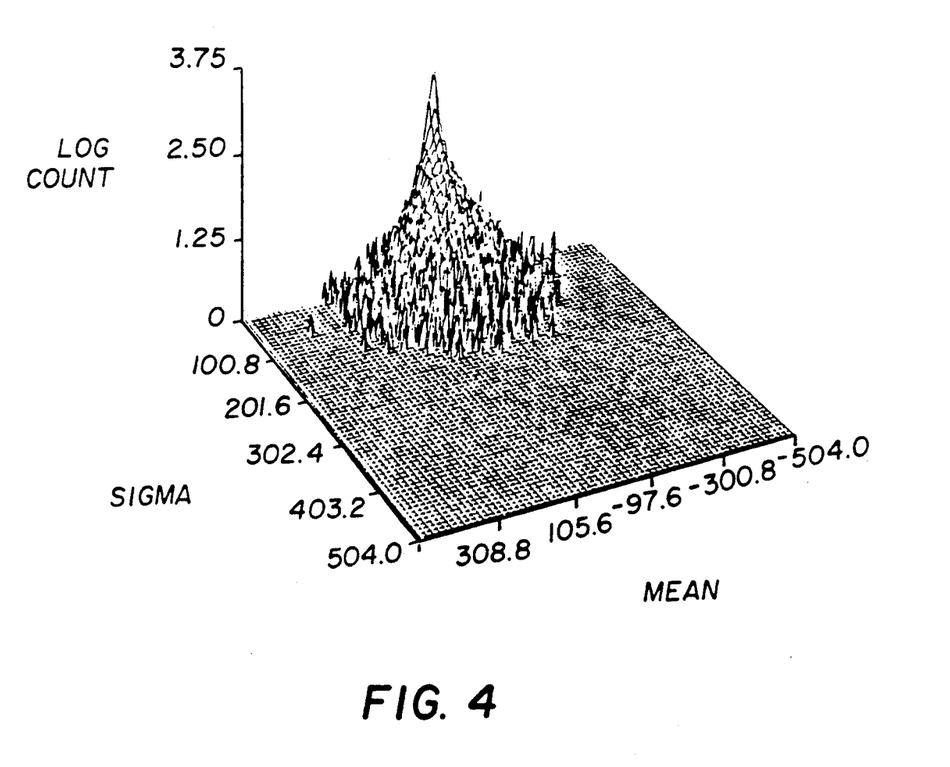
FIG. 4 is a graph showing a typical joint histogram of the ML estimates for the Laplacian mean and sigma in independent image blocks.

FIG. 3 shows a full image error signal histogram that is well fit by this model with $\mu = 0$. Locally, in small image blocks, this zero-mean model breaks down, as illustrated in FIG. 4 which shows the joint histogram of the maximum likelihood (ML) estimates for the Laplacian mean and sigma values of a typical image in five pixel linear blocks. The method of maximum likelihood moment estimation which can be found in many textbooks on mathematical statistics such as "An Introduction to Mathematical Statistics" by R. J. Larsen and M. L. Max, Prentice Hall, Inc., Englewood Cliffs, N.J., 1981, gives for the ML estimates $$\hat{\sigma} = \frac{\sqrt{2}}{N} \sum_{i=1}^{N} |\Delta(i) - \hat{\mu}|, \quad (2)$$

$\hat{\mu} = \text{median}\{\Delta(i), i=1, N\}, N=5.$

FIG. 4 shows that the variations in mean are as significant as the variations in sigma. To optimally adapt to these variations it is necessary to select a set of quantizers that minimizes the total error introduced by the non-stationary of the differential signal, i.e. variations in $\mu$ and $\sigma$, as well as the variations in $\Delta$ given $\mu$ and $\sigma$. For a normalized, i.e. unit variance, reconstruction level r; based on estimates $\mu_m$, $\sigma_n$ of the true Laplacian moments $\mu$, $\sigma$ in a given image block the square error is given by:

$$[(\sigma_n r + \mu_m) - (\sigma \Delta + \mu)]^2. \quad (3)$$

The total square error for normalized decision levels d; and the moment decision levels $q_m$ and $t_n$ are given by:

$$\epsilon^2 = \sum_m \sum_n \sum_j \int_{q_m}^{q_{m+1}} \int_{t_n}^{t_{n+1}} \int_{d_j}^{d_{j+1}} \quad (4)$$

$[(\sigma_n r_j - \sigma \Delta) + (\mu_m - \mu)]^2 p(\Delta, \mu, \sigma,) d\Delta d\sigma d\mu.$ To optimize the quantization, it is necessary to minimize this error with respect to $q_m$, $t_n$, $d_j$, $\mu_m$, $\sigma_n$, and $r_j$. In a given stationary image block defined by $\mu$, $\sigma$ and estimates $\mu_m$, $\sigma_n$ the minimum error decision and reconstruction levels are given by $$d_j = \frac{\sigma_n}{\sigma}\left(\frac{r_j + r_{j-1}}{2}\right) + \frac{\mu_m - \mu}{\sigma}, \quad (5)$$

$$r_j = \frac{\sigma}{\sigma_n}\left(\frac{\int_{d_j}^{d_{j+1}} \Delta p(\Delta | \mu, \sigma) d\Delta}{\int_{d_j}^{d_{j+1}} p(\Delta | \mu, \sigma) d\Delta}\right) - \frac{\mu_m - \mu}{\sigma}.$$

The values of $\mu$ and $\sigma$ are not known exactly and can only be estimated by the quantized values $\mu_m$, $\sigma_n$. Substitution of $\mu_m$ and $\sigma_n$ for $\mu$ and $\sigma$ gives for the decision and reconstruction levels $$d_j = \frac{r_j + r_{j-1}}{2}, \quad (6)$$

$$r_j = \frac{\int_{d_j}^{d_{j+1}} \Delta p(\Delta | \mu_m, \sigma_n) d\Delta}{\int_{d_j}^{d_{j+1}} p(\Delta | \mu_m, \sigma_n) d\Delta}.$$

Using these in the error minimizations for $\mu_m$, $\sigma_n$, $q_m$, $t_n$ gives $$q_m = \frac{\mu_m + \mu_{m-1}}{2}, \quad (7)$$

-continued $$\mu_m = \frac{\int_\sigma \int_{q_m}^{q_{m+1}} \mu p(\mu, \sigma) d\mu d\sigma}{\int_\sigma \int_{q_m}^{q_{m+1}} p(\mu, \sigma) d\mu d\sigma},$$

$$t_n = \frac{\sigma_n + \sigma_{n-1}}{2},$$

$$\sigma_n = \frac{\int_\mu \int_{t_n}^{t_{n+1}} \sigma p(\mu, \sigma) d\mu d\sigma}{\int_\mu \int_{t_n}^{t_{n+1}} p(\mu, \sigma) d\mu d\sigma},$$

Assuming that $\mu$ and $\sigma$ are independent for the sake of simplicity, the reconstruction equations reduce to $$\mu_m = \frac{\int_{q_m}^{q_{m+1}} \mu p(\mu) d\mu}{\int_{q_m}^{q_{m+1}} p(\mu) d\mu}, \tag{8}$$

$$\sigma_n = \frac{\int_{t_n}^{t_{n+1}} \sigma p(\sigma) d\sigma}{\int_{t_n}^{t_{n+1}} p(\sigma) d\sigma}.$$

Figure 5:
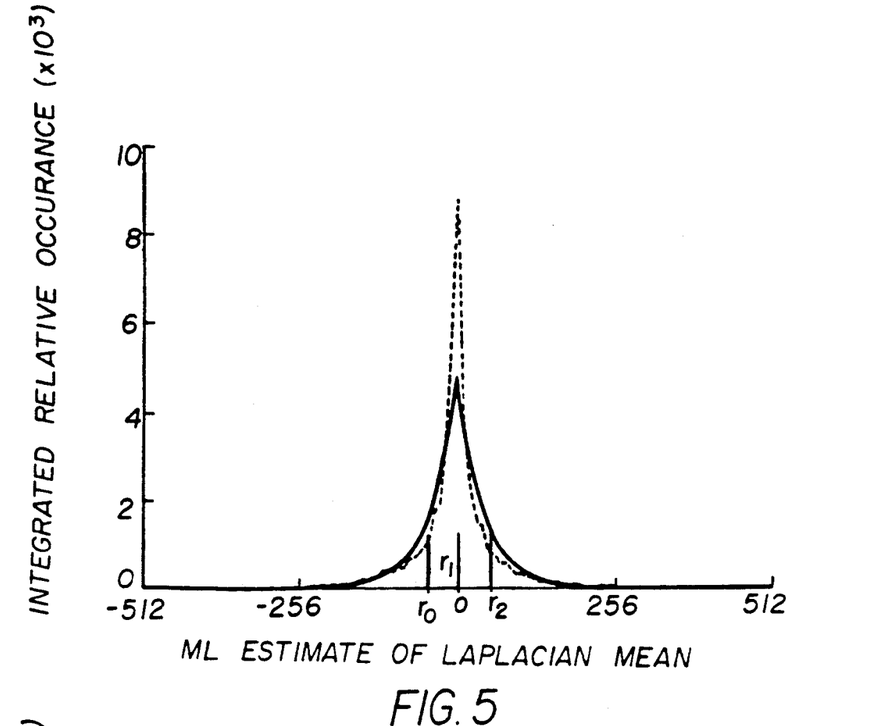
FIG. 5 is a graph showing the marginal histogram of the ML estimate for the Laplacian mean in independent image blocks.
Figure 6:
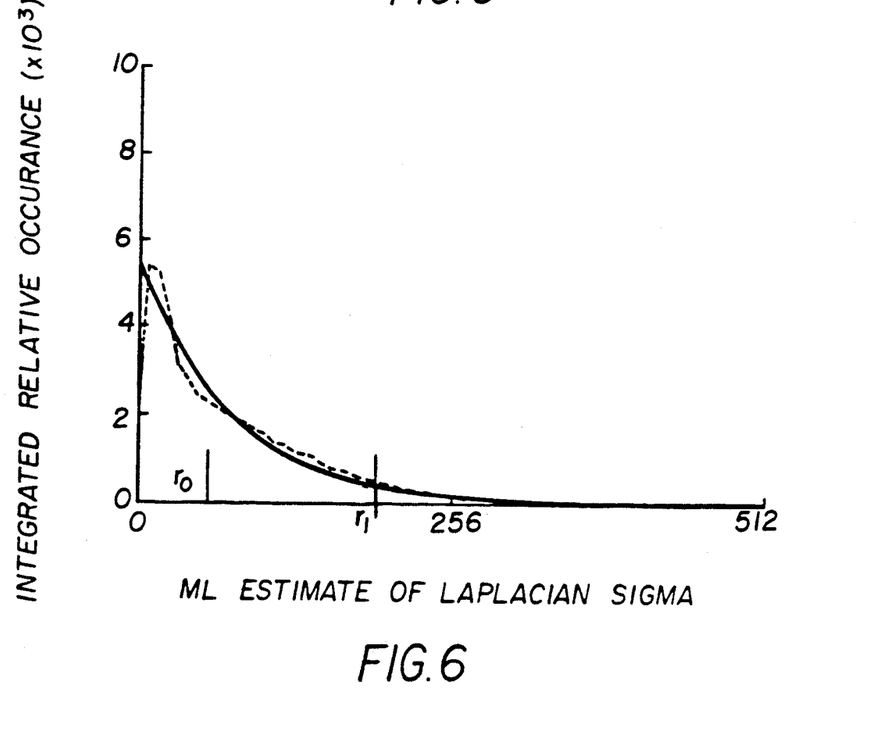
FIG. 6 is a graph showing the marginal histogram of the ML estimate for the Laplacian sigma in independent image blocks.
Figure 7:
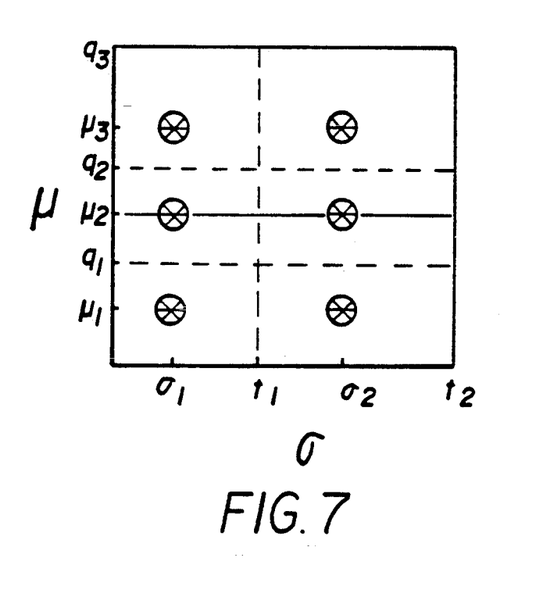
FIG. 7 is a graph illustrating the quantizer selection for the three-bias, two-gain block adaptive quantizer.

To use the reconstruction equations (8) and the equations for $q_m$ and $t_n$ in equations (7) to construct the set of minimum square error quantizer, models for mean and sigma pdf's, $p(\mu)$ and $p(\sigma)$ must be selected. FIGS. 5 and 6 show marginal histograms (dashed curves) for the block mean and the block sigma values for a typical image, the Laplacian (mean) and exponential (sigma) models used to represent them, and the reconstruction levels from equations (8) (solid curves) for a three-bias, two-gain quantizer. The decision levels from equations (7) lie halfway between the reconstruction levels. This three-by-two quantizer is illustrated in FIG. 7, where the dashed lines represent the decision regions and the *'s are at the optimal quantizer moments in each region.

As noted above, in the prior art, these quantizers were applied to one-dimensional linear blocks of error values. The present inventor has discovered that for a signal having correlation in two dimensions, such as an image signal, further gains in compression ratio are achieved by applying the quantizer selection to two-dimensional blocks of error signals, rather than the one-dimensional blocks of the prior art.

Figures 1, 1B:
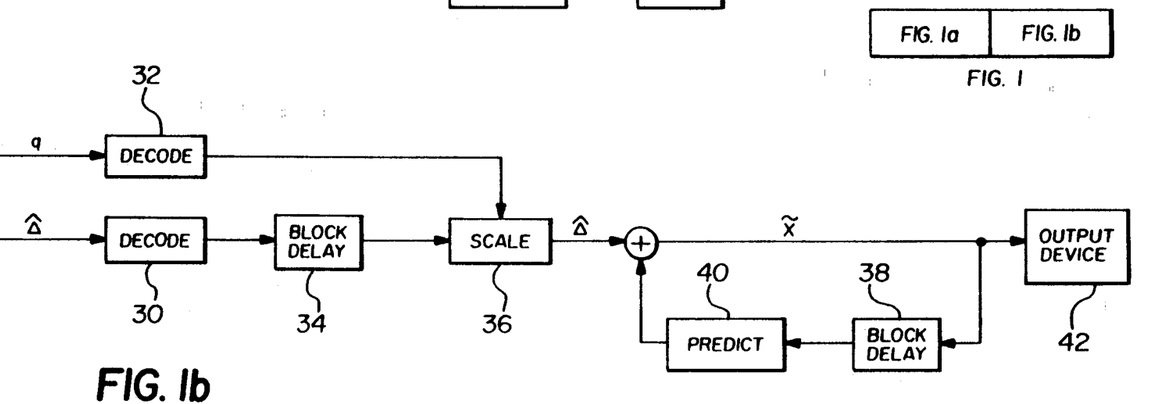
FIGS. 1a and 1b are block diagrams of a compressor and expander, respectively for practicing the image signal processing method according to the present invention.
Figure 1A:
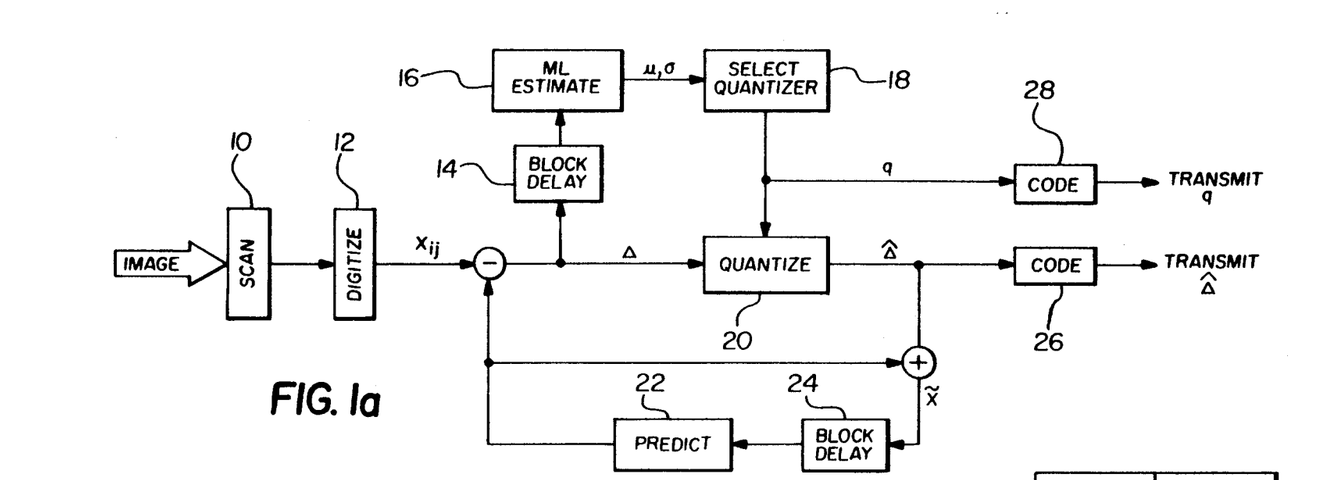

Referring now to FIG. 1a, image processing apparatus employing the block adaptive gain and bias linear predictive coding technique operating on two-dimensional blocks of error signals according to the present invention will be described. An image or scene is sampled by a scanning apparatus 10, such as a video scanner or graphic arts scanner. The sampled image is digitized by an analog-to-digital converter 12 and the digitized sampled image $X_{ij}$ is input into the compressor where it is delayed one block (14). Predictions are made for the pixel values in each block using the prediction equations in FIG. 2 with $e_{ij}=0$ because quantization error cannot be included until the quantizer is selected. These predictions are subtracted from the actual pixel values and the ML estimates (16) for the error signal mean and sigma are calculated in each two-dimensional block according to equations (2). The ML estimates are then used to select (18) the quantizer q (see FIG. 7), and the error signal $\Delta_{ij}$ is quantized (20) using the selected quantizer. The quantized error signals $\hat{\Delta}_{ij}$ are added to the predictions (22) to form reconstructed signals $\tilde{X}_{ij}$ which are block delayed (24) for subsequent predictions (22) and coded (26) along with the selected quantizer q (28) by a lossless minimum redundancy coding technique such as Huffman coding or run-length coding (see for example "Digital Image Processing" by W. K. Pratt, Chapter 22.3, John Wiley & Sons, 1978). The quantized coded error signal $\Delta$ and quantizer q are then transmitted or stored.

Figure 10:
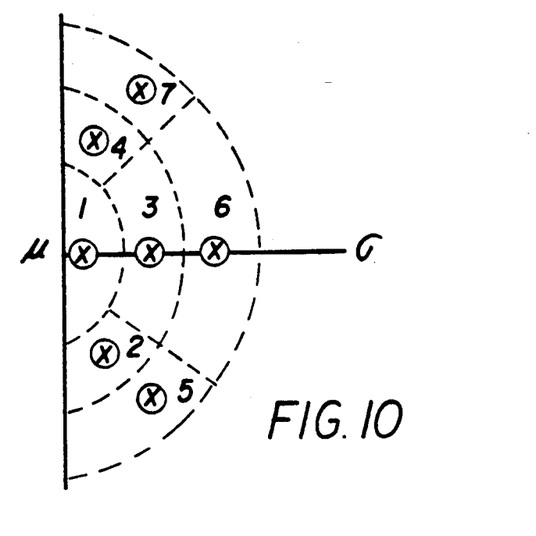
FIG. 10 is a graph showing the quantizer decision and reconstruction values for the polar transformed coordinate system.

The decompressor shown in FIG. 10 accepts the coded values for the selected quantizer q and the quantized error signals $\hat{\Delta}_{ij}$, decodes (30,32) the values and performs the inverse process of the compressor by delaying the signal one block (34), scaling the signal (36) according to the selected quantizer and using the block-delayed (38) decompressed pixel values for predicting (40) the pixel value and adding the predicted pixel values to the decoded error signals.

The image compression and decompression apparatus comprise a programmed general purpose computer such as a microprocessor or alternately a custom designed digital signal processing circuit. The decompressed image can be supplied to an output device (42), such as a CRT display or a hard copy recorder in the event that the image coding was performed to reduce the transmission time or storage requirements of the image. The quantizer selection apparatus (18) includes a memory that contains the quantizer decision and reconstruction levels $q_m$, $\mu_m$, $t_n$, $\sigma_n$.

The predictor apparatus (22) includes a memory that contains the prediction coefficients $a_0$, $a_1$, and $a_2$ for forming the linear prediction. The quantizer apparatus (20) includes a memory that contains Max quantizer decision and reconstruction values for a zero-mean, unit variance Laplacian signal. See for example, "Digital Image Processing" by W. K. Pratt, Table 6.1-1, page 144, John Wiley & Sons, 1978.

Figure 8A:
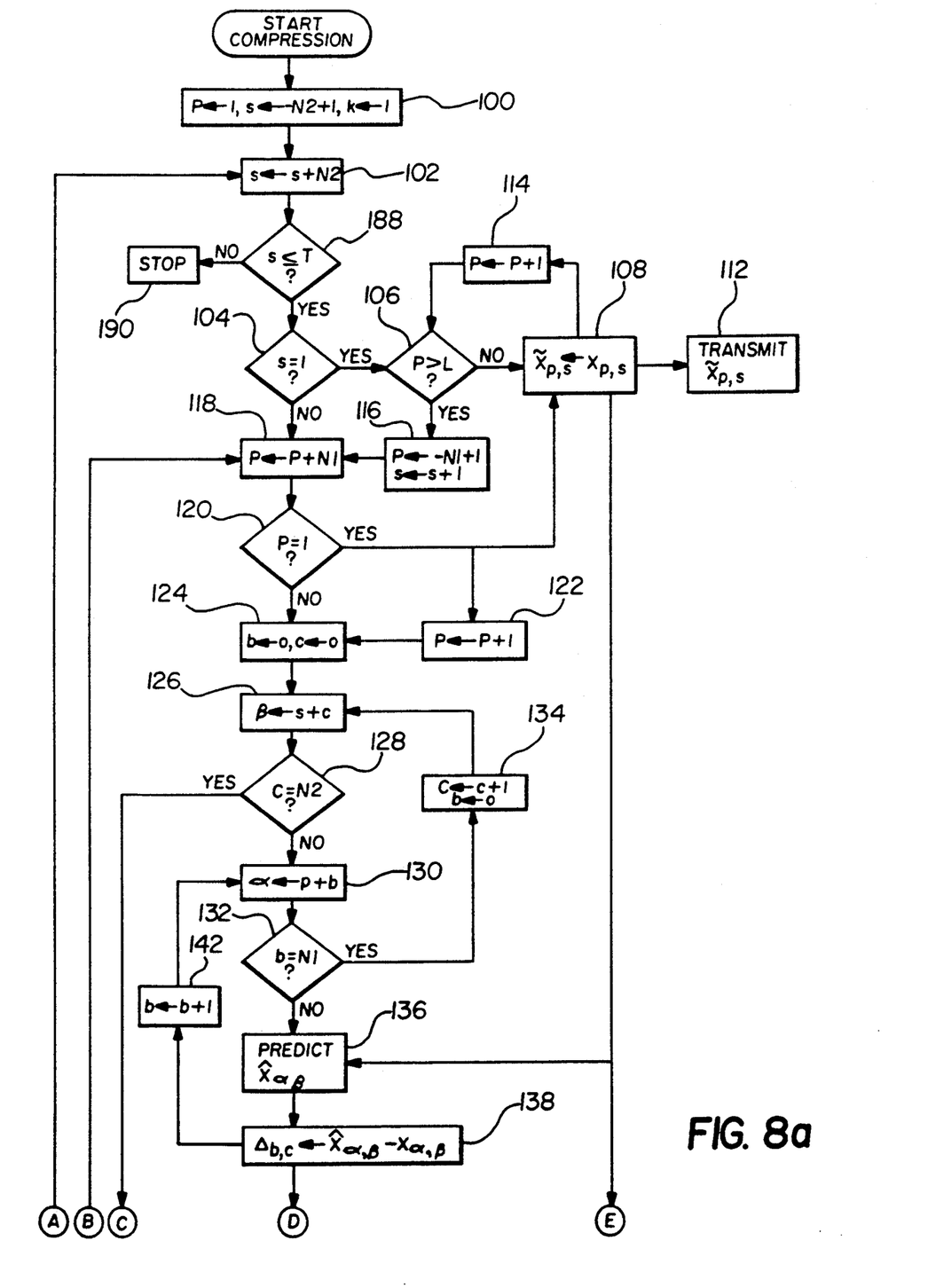
FIGS. 8a and 8b are flow charts illustrating the compressor for a block adaptive gain and bias linear predictive coding technique for two-dimensional blocks according to the present invention.
Figure 8B:
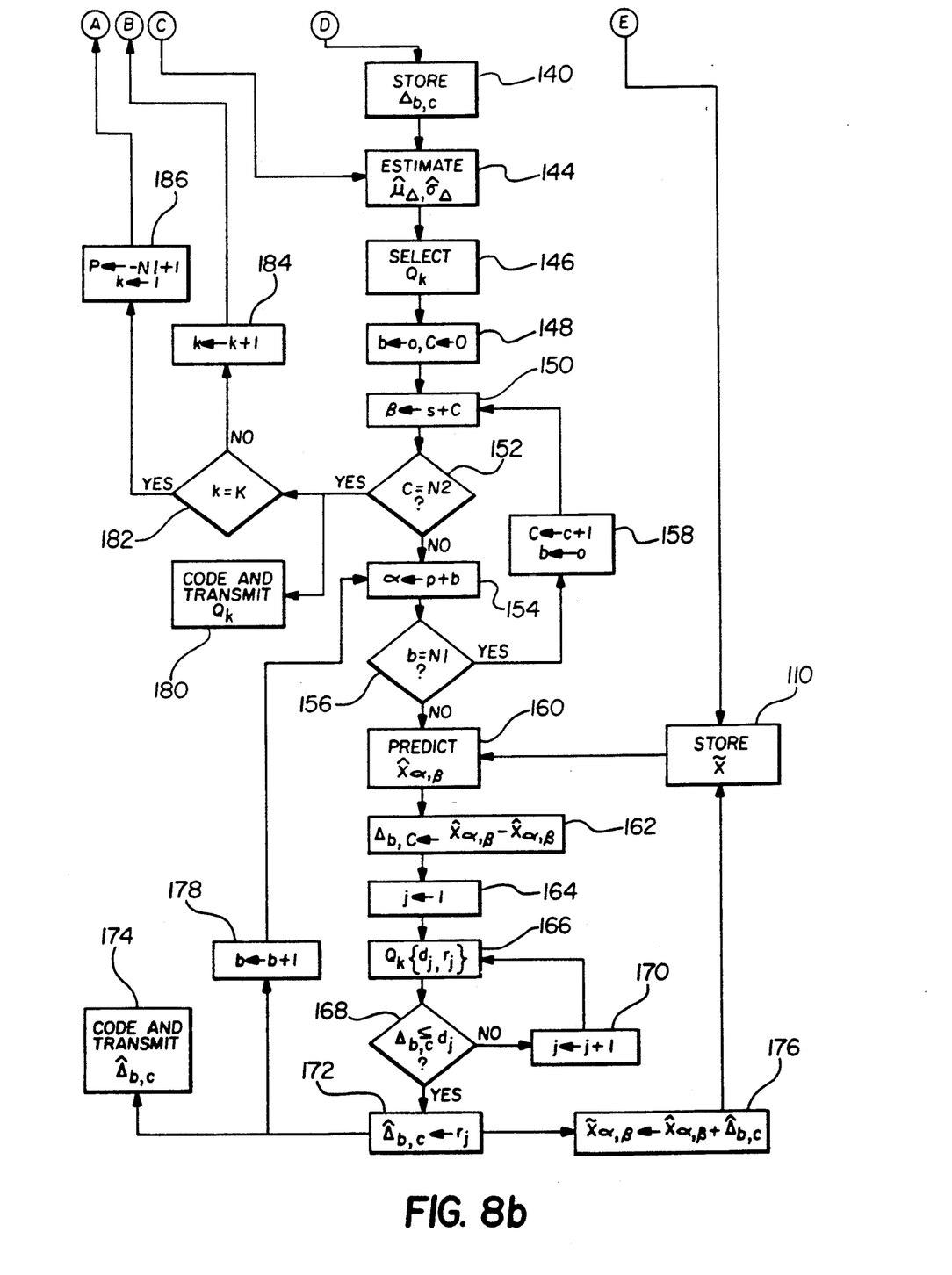

The compressor for the block adaptive gain and bias linear predictive coding technique by programming a microprocessor will now be described with reference to the flow charts shown in FIGS. 8a and 8b. It will be obvious to one skilled in the art how to program the microprocessor from the following description. The following description assumes that the image signal is presented to the compressor in a linear raster scan of L pixels and T lines. At the start of scan, internal counters p for the first pixel number in the block, s for the first scan line in the block, and k for the block number are initialized (100). Counter s is incremented (102) by the line block size N2, and a check (104) is made for the first line s=1. If true, p is compared (106) with the line length L and if it is less than or equal to L, the pixel value $x_{p,s}$ is assigned (108) to the reconstructed pixel value $\tilde{x}_{p,s}$, stored (110) for future use in prediction and is transmitted (112). The pixel number p is incremented (114) by 1 and the process is repeated until p is greater than L at which point the first line has been transmitted without compression. The pixel number is reinitialized (116) and s is incremented by 1. If false, pixel number is incremented (118) by the pixel block size N1, and a check (120) is made for the first pixel, p=1. If true, $x_{p,s}$ is assigned (108) to the reconstructed pixel $\tilde{x}_{p,s}$, stored (110), and transmitted (112), and p is incremented by 1 (122). If false, the pixel b, and line c, counters within a block are initialized (124), the block line counter is added (126) to the first line of the block, and a check (128) is made for the end of block. If false, the pixel pointer is incremented (130) by the block pixel counter, and a check (132) is made for the end of block in the pixel direction. If true, the block pixel counter is reinitialized (134), the block line is incremented (134), and the next line of the block is processed. If false, the current pixel is predicted (136) based on the equations in FIG. 2 using the stored (110) reconstructed pixel values outside the block and the actual pixel values within the block. The error or difference signal, Δ, between the predicted value and actual value is calculated (138), and stored (140). The block pixel counter is incremented (142) and the process is continued until the end of block is reached and the check (128) is true. The stored error signals for the block are then used to estimate (144) the mean error $\hat{\Delta}$ and sigma error $\hat{\sigma}$ using equations (2), for example, and the quantizer is selected (146) using the data base of quantizer decision regions (see FIG. 7). The block counters are reinitialized (148), the block line counter is again added (150) to the first line of the block, and the end of block is checked (152). If false, the pixel pointer is incremented (154) by the block pixel counter, and the end of block in the pixel direction is checked (156). If true, the block pixel counter is initialized (158), the block line counter is incremented (158) and the next line in the block is processed. If false, the current pixel value is predicted (160) using the reconstructed pixel values inside and outside the block, and the error or difference signal Δ between the predicted value and actual value is calculated (162). The quantization counter j is initialized (164) and the decision $d_j$ and reconstruction $r_j$ values for the selected quantizer $Q_k$ referenced (166). The error signal is compared (168) with the $j^{th}$ decision level. If greater, the counter is incremented (170) and the comparison continued. If less or equal the error signal is replaced (172) by the quantized reconstruction level which is coded and transmitted (174). The reconstruction level is added (176) to the prediction to form the reconstructed pixel value which is then stored (110) for future predictions. The block pixel counter is incremented (178) and the process of prediction and quantization repeated until the end of block is reached and (152) is true. The quantizer $Q_k$ for block k is coded and transmitted (180) and a check (182) is made to determined if the total number of blocks K on a line have been processed. If false, the block counter is incremented (184) and the next block is processed by incrementing (118) the pixel pointer p one block width. If true, the end of the line has been reached, the block counter and pixel pointer are reinitialized (186), and the line pointer is incremented (102) one block height N2. The pointer is compared (188) with the last line. If less or equal, the new line of blocks is processed. If greater, the end of the image has been reached and the compression is stopped (190). The decompressor accepts the transmitted signals and performs predictions and addition processes identical to those defined by the reconstruction steps (160, 176) in the flow chart of FIGS. 8a, 8b using the transmitted quantizer (180) for scaling the transmitted Δ values.

Results of applying the image compression and decompression method according to the present invention to an 11-bit (i.e. 0–2047) aerial image and an 11-bit portrait will now be discussed. Tables I and II show the root mean square error in 11-bit counts between the original and compressed/decompressed image for the aerial and portrait images respectively for 1-bit non-adaptive LPC (prior art), 1-bit one-dimensional gain adaptive LPC (prior art), 1-bit one-dimensional gain and bias adaptive LPC (per U.S. Pat. No. 4,885,636), and the 1-bit two-dimensional gain and bias adaptive LPC method of the present invention. The linear prediction in all cases was two-dimensional and given by half the previous pixel on the current line and half the current pixel on the previous line. For reference, the input sigma values for the image and error image in 11-bit counts are 403 and 112 respectively for the aerial image and 834 and 83 respectively for the portrait. The signal-to-noise improvement from selecting the quantizer in a two-dimensional, i.e. 2×2 pixels, rather than one-dimensional, i.e. 1×4 pixels, block for the aerial image is approximately 3 dB, i.e. 59→43 rms noise counts, and for the portrait it is 2 dB, i.e. 51→41 rms noise counts.

TABLE I

| | Aerial Image | |
|---|---|---|
| LPC method | | rms error 11-bit counts |
| non-adaptive | | 141 |
| 1D gain-adaptive | | 93 |
| 1D gain and bias adaptive | | 59 |
| 2D gain and bias adaptive | | 43 |

TABLE II

| | Portrait | |
|---|---|---|
| LPC method | | rms error 11-bit counts |
| non-adaptive | | 171 |
| 1D gain-adaptive | | 109 |
| 1D gain and bias adaptive | | 51 |
| 2D gain and bias adaptive | | 41 |

Figure 9:
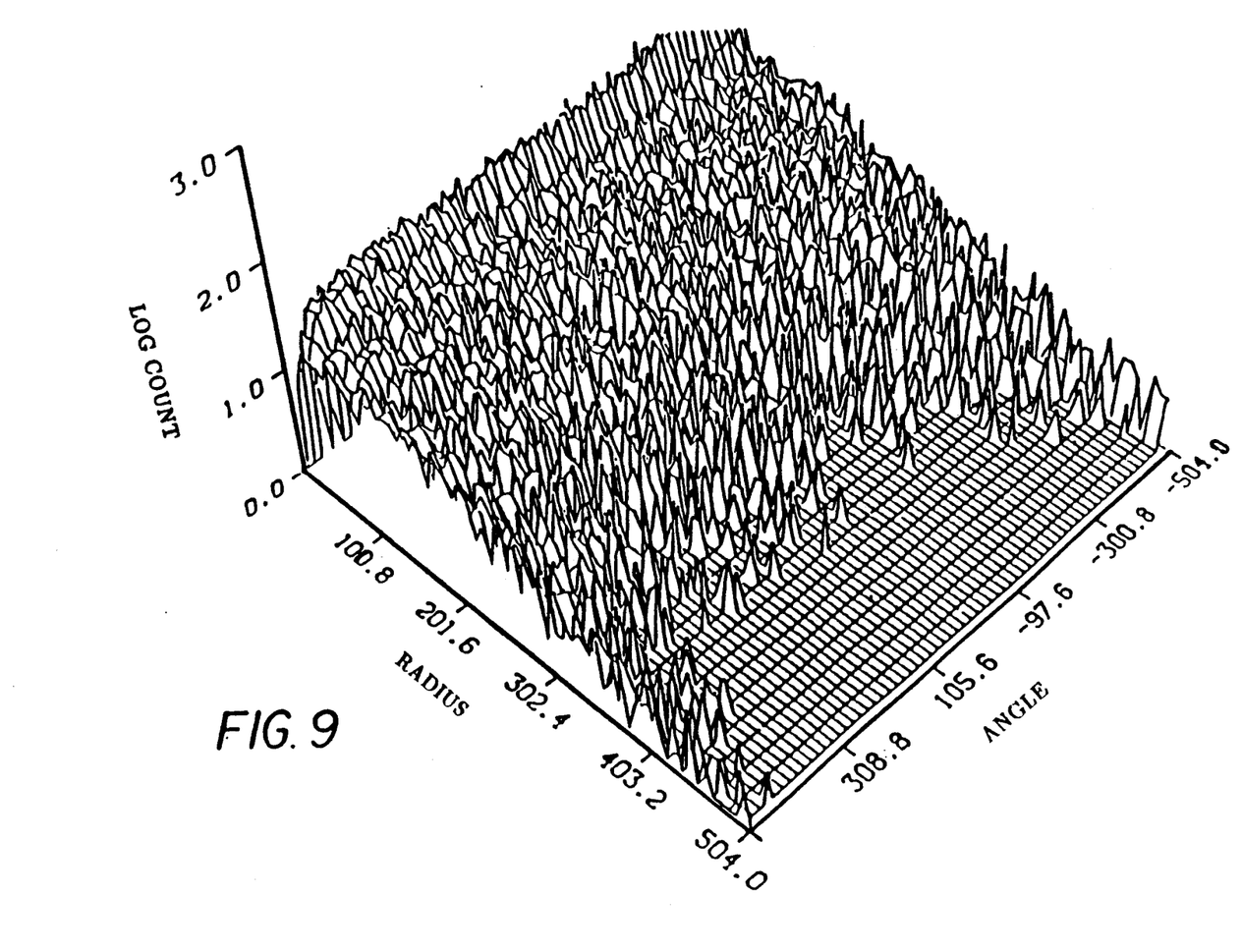
FIG. 9 is a plot of the log probability of sigma and mean in a polar transformed coordinate system.

Extensions of the present invention will now be discussed. Reference to FIG. 4 shows that the assumption of independence for $\mu$ and $\sigma$ used to simplify equations (8) is not strictly correct. The figure displays a radial symmetry rather than the rectangular symmetry required for independence indicating that the variable defined by $\hat{\mu}^2 + \hat{\sigma}^2$, and arctan $$\left(\frac{\hat{\sigma}}{\hat{\mu}}\right)$$

are more likely independent variables. A transformation of this form followed by independent scalar quantizations, such as in equations (8) can be used to define the decision and reconstruction levels in terms of the transformed variables and an inverse transformation performed on these levels to determine the mean and sigma decision and reconstruction levels. The resultant decision regions will be annular and the reconstruction levels will lie along radial arcs. The transformation of FIG. 4, is shown in FIG. 9, and the resultant quantizer decision and reconstruction values for seven quantizers are shown in FIG. 10. Also to simplify the implementation, the ML estimates for $\hat{\mu}$ and $\hat{\sigma}$ in equation (2) have been replaced by $$\hat{\mu} = \frac{1}{N} \sum_{i=1}^{N} \Delta(i), N = 5, \text{ and} \qquad (9)$$

-continued $$\hat{\sigma}^2 = \frac{1}{N} \sum_{i=1}^{N} \Delta^2(i), N = 5. \quad (10)$$

Figure 11:
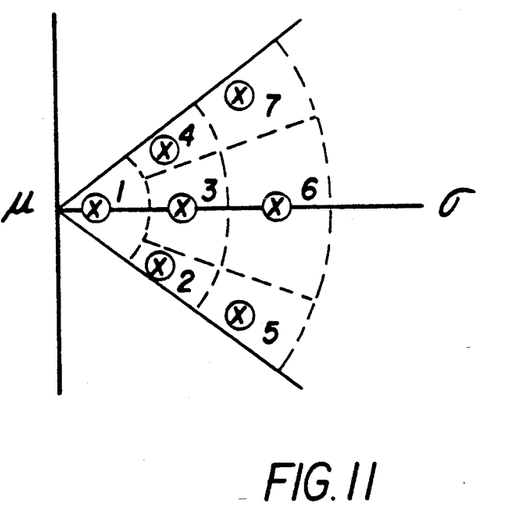
FIG. 11 is a graph showing the quantizer decision and reconstruction values similar to FIG. 10, for a reduced region of support.

In addition to allowing for a parallel estimation of $\hat{\sigma}$ by not subtracting $\hat{\mu}$, equation (10) produces an image quality improvement because it increases the weighting of large $\Delta(i)$ values compared to equation (2) causing larger steps in the quantizers and better rendition of edges. By not subtracting $\hat{\mu}$, the region-of-support of FIG. 10 is reduced as shown in FIG. 11. The new decision regions and reconstruction levels represent a uniform Max quantizer for arctan $$\left( \frac{\hat{\sigma}}{\hat{\mu}} \right)$$

and an exponential Max quantizer for $\hat{\mu}^2 + \hat{\sigma}^2$.

Figure 12:
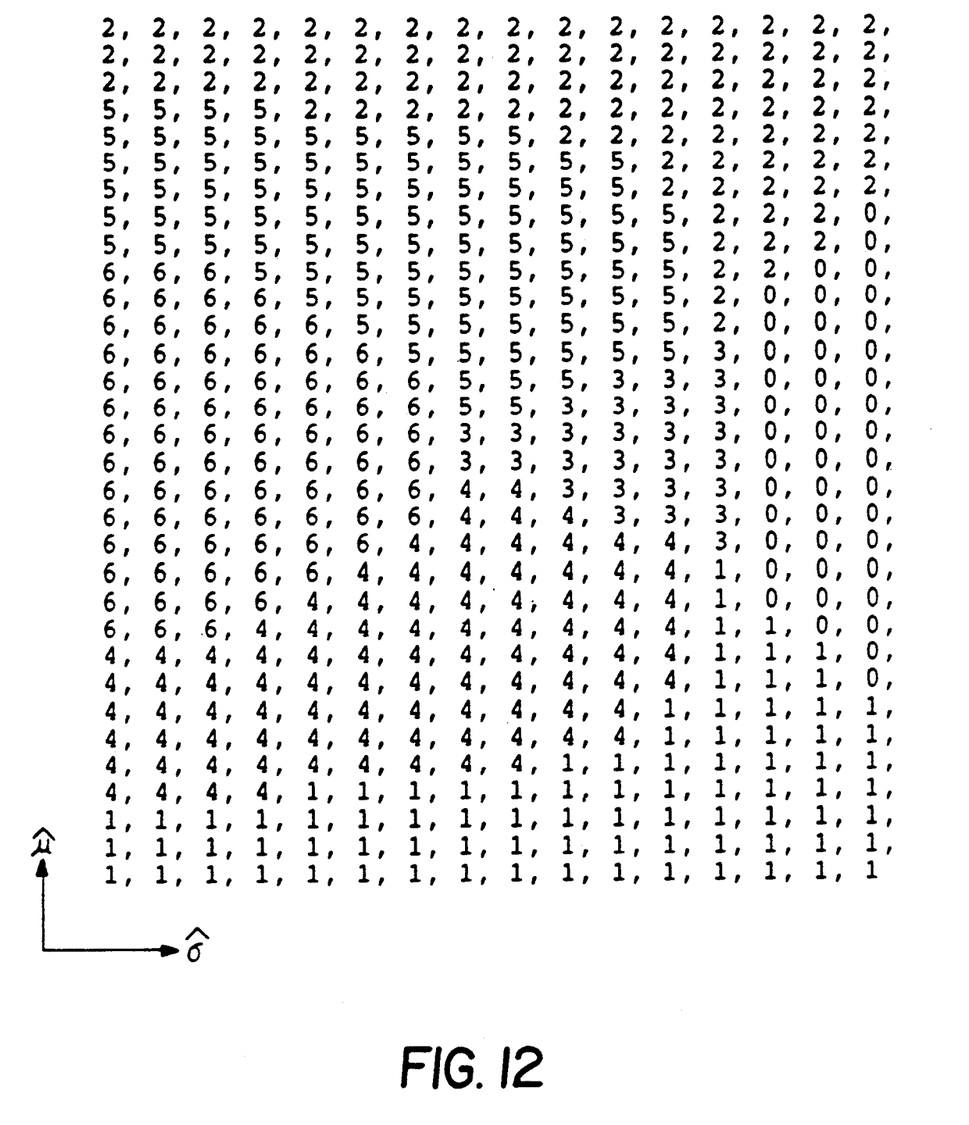
FIG. 12 is an example of a look up table employed to select quantizers according to one mode of the present invention.

To simplify implementation, the $\hat{\mu}$ and $\hat{\sigma}$ values from equations (9) and (10) are scaled and used as indices into a two-variable look up table that has the quantizer number stored in the appropriate regions to produce the effect of these radial decision regions. An example 16×16 table is shown in FIG. 12 for 7 quantizers.

A second improvement regards the design of the selected quantizers to have a variable number of decision and reconstruction levels. For example, the high or low mean, high sigma value quantizers represent high contrast positively or negatively sloped edges which may require more levels than lower contrast image structures for adequate coding. Increasing the number of levels for these quantizers does not increase the required overhead information but it does cause a variable number of differential signal bits/block. Reference to FIG. 4, however, shows that the total number of bits for the compressed image will not be increased significantly by such a modification because the high or low mean, high sigma value quantizers are not used often in a typical image. For highly detailed graphical images, it has been empirically determined that the low-to-medium contrast (i.e. low-to-medium $\hat{\sigma}$) quantizers, (see decision regions 1-4 in FIG. 11) require 3 levels, and the high contrast quantizers (i.e. high $\hat{\sigma}$) (see decision regions 5-7 in FIG. 11) require 4 levels.

Figure 13:
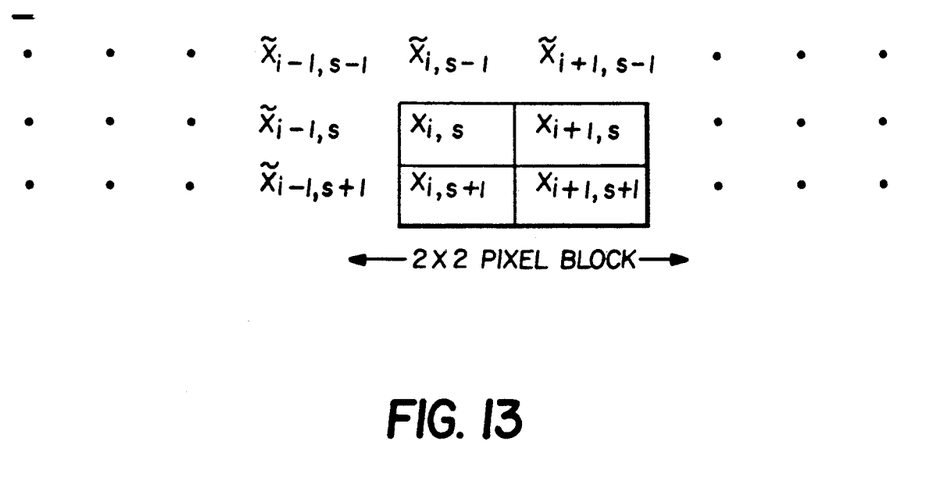
FIG. 13 is a schematic diagram useful in explaining the present invention.

This trend toward fewer levels in low contrast regions have been extended to the limit of no levels for extremely low contrast areas of visually subthreshold modulation. In such areas the output image is defined by a fixed function of the previously reconstructed pixels block and averages of their nearest reconstructed neighbors. This is shown schematically for a 2×2 block in FIG. 13. With $i_o$ denoting the first pixel in a block and $s_o$ the first line, S for example can be $$S = \frac{1}{N1N2} \sum_{i=i_o}^{i_o+N1-1} \sum_{s=s_o}^{s_o+N2-1} |A - X_{i,s}| \quad (11)$$

where $X_{i,s}$ is an input pixel value, and A for example can be $$A = \frac{1}{N1N2} (\tilde{X}_{i_o,s_o-1} + \tilde{X}_{i_o+1,s_o-1} + \cdots + \quad (12)$$

$$\tilde{X}_{i_o+N1-1,s_o-1} + \tilde{X}_{i_o-1,s_o} + \tilde{X}_{i_o-1,s_o+1} + \cdots + \tilde{X}_{i_o-1,s_o+N2-1}).$$

For a fixed threshold T, the block is part of a run if $$S < T.$$

The number of contiguous runs times the number of pixels in a block defines the total number of pixels that are reconstructed at the average value A. There is no error signal information transmitted in a run only the fact that the block is a run. This is considered as an additional quantizer which added to the seven quantizers of FIG. 11 can be represented by 3 bits. The number of runs in a typical high-quality, continuous-tone image ranges from 30-60%, which given the encoding scheme described below, corresponds to an approximate bit-rate reduction of 0.5-1.0 bits/pixel without visible degradation.

To improve the bit-rate without a loss in image quality, Huffman coding and decoding (see, for example, Digital Signal Processing by R. C. Gonzalez and P. Wintz, Addison-Wesley Co., Pages 239-241) has been added for the quantizers and the 3 and 4 level differential signal values. FIG. 4 shows that the low-sigma, zero-mean quantizer is selected a high percentage of the time and therefore should be coded with the fewest bits with the remaining quantizers being coded with a number of bits that is inversely proportional to their usage. It has also been found that adjacent quantizers are highly correlated and that a second order Huffman Code, where the code for a particular block is based on the previous quantizer, can produce a bit savings.

Table 1 shows an example set of second order Huffman codes for the quantizers, where quantizer number 8 is a run block, that illustrates the adjacent quantizer correlation with fewer bits along the diagonal.

TABLE 1

| | | Huffman Codes for Quantizer Overhead | | | | | | | |
|---|---|---|---|---|---|---|---|---|---|
| | | Current Quantizer | | | | | | | |
| | | 1 | 2 | 3 | 4 | 5 | 6 | 7 | 8 |
| Previous | 1 | 10 | 1000 | 1100 | 0000 | 000100 | 100100 | 10100 | 1 |
| Quantizer | 2 | 11 | 01 | 110 | 010 | 1000 | 10000 | 00000 | 100 |
| | 3 | 01 | 000 | 100 | 010 | 0110 | 1110 | 111 | 011 |
| | 4 | 01 | 100 | 010 | 11 | 00000 | 10000 | 1000 | 110 |
| | 5 | 101 | 000 | 0100 | 111 | 10 | 1100 | 001 | 011 |
| | 6 | 000 | 001 | 010 | 011 | 100 | 101 | 110 | 111 |
| | 7 | 111 | 001 | 101 | 000 | 100 | 0011 | 10 | 1011 |
| | 8 | 0 | 011 | 111 | 001 | 00101 | 10101 | 1101 | — | that requires no pixel information. This is termed a "run" and it is defined by comparing a fixed threshold value with a structure estimate S in a N1×N2 image block where for example, S can be given by the mean absolute difference between the pixel values in the The table also shows that if the previous quantizer is 6, which represents a zero-mean, high-contrast error signal that all subsequent quantizers are equally likely making Huffman coding unnecessary, and that the probability of a run block following low-medium contrast quantizer, i.e. 1, 2, 3, or 4 or a low-medium contrast quantizer following a run is high producing short Huffman codes. The 8/8 code, i.e. run/run, is left blank in the table because the length of runs is encoded as a special case. Once a code that represents any quantizer followed by a run is encountered, the continuation of the run is represented by a bit value of 0 for each 4 block length of run and unique codes that begin with a bit value of 1 for the last group of run blocks with a length of 4 or less. The first quantizer of the run is then linked back to the last quantizer before the run and coded with Table 1. In addition, since Huffman codes are designed globally and can be quite inefficient locally, the total number of Huffman coded quantizer bits are counted for each line and compared with the number of uncoded bits and the minimum length bit string is transmitted with a flag bit set to instruct the receiver as to which was selected.

In addition, first order Huffman coding is done on the error signals from quantizers 2, 3, 4, 5, and 7 with typical probabilities and Huffman codes shown, in Table 2 where higher level numbers correspond to more positive error signals.

TABLE 2

| Huffman Codes for Error Signals | | |
|---|---|---|
| | Average Probability | Huffman Code |
| 3-level quantizers (2,3,4) level number | | |
| 2 | 0.60 | 0 |
| 1 | 0.20 | 01 |
| 3 | 0.20 | 11 |
| 4-level quantizer (5) level number | | |
| 2 | 0.60 | 0 |
| 3 | 0.20 | 01 |
| 1 | 0.15 | 011 |
| 4 | 0.05 | 111 |
| 4-level quantizer (7) level number | | |
| 3 | 0.60 | 0 |
| 2 | 0.20 | 01 |
| 4 | 0.15 | 011 |
| 1 | 0.05 | 111 |

Implementation of the coding and decoding techniques have been carried out in the C programming language on IBM PC computer for a high quality digital graphics image transmission system that utilizes standard telephone communication links.

Industrial Applicability and Advantages

The digital image processing method of the present invention is useful in systems for compressing multi-dimensional digital signals such as two-dimensional still color images, three-dimensional video color images, and k-dimensional medical diagnostic images for storage or transmission. The invention has the advantage that compression ratios are substantially improved without substantially adding to the complexity of the hardware for compressing and expanding the image.

What is claimed is:

1. An improved block adaptive predicative coding method comprising the steps of:
  a) forming a set of error differences by subtracting pixel prediction values from actual image pixel values for each pixel of a particular multi-dimensional block;
  b) computing statistical parameters of the error differences for said particular multi-dimensional block;
  c) selecting one of a finite set of quantizers in accordance with said computed statistical parameters for said particular multi-dimensional block;
  d) quantizing the error differences of step a) utilizing the selected quantizer of step c) to form quantized error differences; and
  e) forming a code representing said quantized error differences formed in step d and said set of quantizers selected in step c.

2. The method of claim 1 and further comprising the step of:
  iterating steps a) through d) for each multi-dimensional block representing a discrete signal.

3. The method claimed in claim 2, wherein the statistical parameters are a statistical estimate of the range of error signals in a block and a statistical estimate of a centroid of the error signal in the block.

4. The method claimed in claim 3, wherein the estimate of the range of error signals is a sigma value ($\hat{\sigma}$) and the statistical estimate of the centroid is a mean value ($\hat{\mu}$).

5. A block adaptive linear predictive coding method for compressing and transmitting or storing a k-dimensional digital image having pixels capable of being divided into k-dimensional blocks, comprising the steps of:
  a. dividing the image into k-dimensional $N1 \times N2 \times \ldots \times Nk$ blocks of pixels, where Nk represents the size of the block in pixels (N) in the kth dimension, and where N1 and N2 are greater than 1;
  b. for each pixel in a block,
    i) forming a predicted pixel value based upon a linear combination of previously coded error signals for neighboring pixels;
    ii) forming an error signal by subtracting the predicted pixel value from the pixel value;
  c. quantizing the error signals in each particular block by selecting a quantizer based on the statistics of the error signals in that particular block; and
  d. transmitting or storing a code representing the quantizer and a code representing the quantized error signals.

6. The method claimed in claim 5, wherein said step of quantizing, comprises:
  a. calculating sigma ($\hat{\sigma}$) and mean ($\hat{\mu}$) values of the error signals in each block, and
  b. selecting a quantizer for each block using the calculated sigma and means from a set of minimum square error two-variable quantizers based on probability models for a function of the mean ($\hat{\mu}$) and sigma ($\hat{\sigma}$) values.

7. The method claimed in claim 5, further comprising the steps of:
  a. performing a polar transformation on the mean ($\hat{\mu}$) and sigma ($\hat{\sigma}$) values, where the polar angle is arctan $$\left(\frac{\hat{\sigma}}{\hat{\mu}}\right)$$

and the polar radius is $\hat{\mu}^2 + \hat{\sigma}^2$; and b. employing the transformed polar angle and polar radius values to select a set of minimum square error two-variable quantizers based upon a uniform probability model for the polar angle and an exponential probability model for the polar radius.

8. The method claimed in claims 5, 6, or 7, wherein the quantizers have different numbers of quantization levels based on the value of $\hat{\sigma}$, higher values of $\hat{\sigma}$ having more quantizer levels.

9. A block adaptive linear predictive coding method for compressing and transmitting or storing a digital image comprising the steps of:
  a) dividing the image into two-dimensional NxM blocks, where N,M are greater than one,
  b) for each pixel in a block,
    i) forming a predicted pixel value based upon a linear combination of previously coded error signals for neighboring pixels;
    ii) forming an error signal by subtracting the predicted pixel value from the pixel value;
  c) computing an average absolute value S of the difference between the pixel value and an average A of reconstructed neighboring pixel values, and comparing such average absolute value S with a threshold value T, and if S is less than T, treating the block as one in a run of blocks;
  d) for a block not in a run of blocks,
    i) calculating the statistics of the error signals in the block, and
    ii) quantizing the error signals in the block by selecting a quantizer based on the statistics of the error signals in the block; and
  e) for blocks in a run, transmitting or storing a code representing that the block is in a run, and for blocks not in a run, transmitting or storing a code representing the quantizer and a code representing the quantized error signal in the block.

10. The method claimed in claim 9, wherein the statistics of the error signal are the mean ($\hat{\mu}$) and the sigma ($\hat{\sigma}$) and the quantizer is a minimum square error two-variable quantizer based on probability models for a function of the mean ($\hat{\mu}$) and sigma ($\hat{\sigma}$) values.

11. The method claimed in claim 9, further including the steps of:
  a. performing a polar transformation on the mean ($\hat{\mu}$) and sigma ($\hat{\sigma}$) values, where the polar angle is is arctan $$\frac{\hat{\sigma}}{\hat{\mu}}$$

$$\left(\frac{\hat{\sigma}}{\hat{\mu}}\right)$$

and the polar radius is $\hat{\mu}^2 + \hat{\sigma}^2$; and b. employing the transformed polar angle and polar radius values to select a set of minimum square error two-variable quantizers based upon a uniform probability model for the polar angle and an exponential probability model for the polar radius.

* * * * *